(12) United States Patent
Sakato et al.

(10) Patent No.: US 11,310,410 B2
(45) Date of Patent: Apr. 19, 2022

(54) IMAGE CAPTURING APPARATUS, METHOD OF CONTROLLING SAME, AND STORAGE MEDIUM

(71) Applicant: CANON KABUSHIKI KAISHA, Tokyo (JP)

(72) Inventors: Kazuma Sakato, Kawasaki (JP); Yohei Horikawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 314 days.

(21) Appl. No.: 16/707,784

(22) Filed: Dec. 9, 2019

(65) Prior Publication Data

US 2020/0195855 A1  Jun. 18, 2020

(30) Foreign Application Priority Data

Dec. 12, 2018 (JP) .............................. JP2018-232836

(51) Int. Cl.
  *H04N 5/232* (2006.01)
  *G06T 7/80* (2017.01)
  *G03B 13/32* (2021.01)

(52) U.S. Cl.
  CPC ....... *H04N 5/232122* (2018.08); *G03B 13/32* (2013.01); *G06T 7/80* (2017.01); *G06T 2207/20212* (2013.01)

(58) Field of Classification Search
  CPC .. H04N 5/232122; H04N 5/2353; G06T 7/80; G06T 2207/20212; G03B 13/32
  See application file for complete search history.

(56) References Cited

U.S. PATENT DOCUMENTS

| 2014/0063297 | A1* | 3/2014 | Yamura | H04N 5/367 348/242 |
| 2015/0319412 | A1* | 11/2015 | Koshiba | H04N 5/36961 348/246 |
| 2016/0269605 | A1* | 9/2016 | Ishii | H04N 5/378 |
| 2016/0337578 | A1* | 11/2016 | Kikuchi | H04N 5/347 |
| 2017/0353678 | A1* | 12/2017 | Ogushi | H04N 5/35581 |
| 2018/0352199 | A1* | 12/2018 | Hwang | H01L 27/14605 |

FOREIGN PATENT DOCUMENTS

| JP | 2016-109766 A | 6/2016 |
| JP | 2018-031877 A | 3/2018 |

* cited by examiner

*Primary Examiner* — Lin Ye
*Assistant Examiner* — John H Morehead, III
(74) *Attorney, Agent, or Firm* — Cowan, Liebowitz & Latman, P.C.

(57) ABSTRACT

An image capturing apparatus is provided with an image sensor having phase difference detection pixels for performing focus detection, an exposure control unit for causing at least the phase difference detection pixels to perform a plurality of accumulations whose exposure periods are a second exposure period shorter than a first exposure period which is a target for obtaining a main image by the image sensor, and a prediction unit for predicting an in-focus position of a subject based on signals of at least two phase difference detection pixels obtained by at least two accumulations among the plurality of accumulations whose exposure periods are the second exposure period.

18 Claims, 11 Drawing Sheets

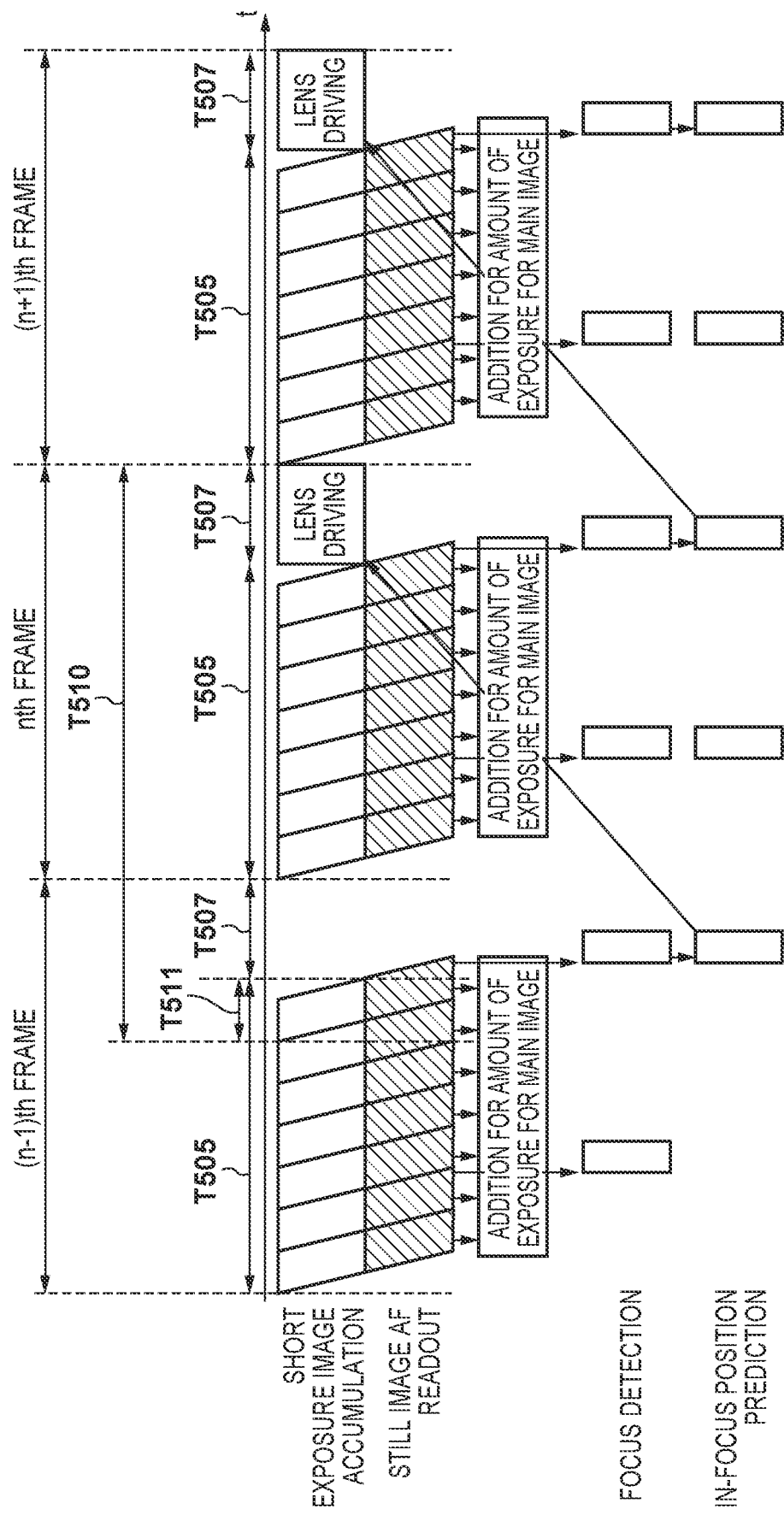

IMAGE CAPTURING APPARATUS, METHOD OF CONTROLLING SAME, AND STORAGE MEDIUM

BACKGROUND OF THE INVENTION

Field of the Invention

The present invention relates to a focus detection technique in an image capturing apparatus.

Description of the Related Art

Conventionally, there has been known a technique called panning in which a background is blurred to produce a sense of dynamism. In the case of performing such shooting, in order to blur the background, there may be continuous shooting in which the shutter speed is made slower than in the case of still image shooting in which the background is not blurred. In addition, when a subject moves in a depth direction or an image height direction, it is necessary to focus by auto focus (hereinafter referred to as AF) while performing continuous shooting.

As an autofocus method, there is known an imaging surface phase difference AF technique in which phase difference detection pixels are arranged in an image sensor, a defocus amount is calculated based on a signal from the phase difference detection pixels, and a lens is driven to perform focusing. In addition, there is also known a method of predicting a position of a subject based on a change in a defocus amount for each image continuously shot.

For example, in Japanese Patent Laid-Open No. 2018-31877, a live view image is exposed during continuous shooting of a main image, a defocus amount is calculated using the live view image, and lens driving is performed. Further, in Japanese Patent Laid-Open No. 2016-109766, tracking detection is performed using an AF evaluation value of an (n−1)th frame and an AF evaluation value of an nth frame, and a result of the tracking detection of the nth frame is obtained at the end of exposure of the nth frame.

However, in the conventional technique disclosed in Japanese Patent Laid-Open No. 2018-31877, it is necessary to expose a live view image separately from a main image, and it is difficult to increase the continuous shooting speed.

In the conventional technique disclosed in Japanese Patent Laid-Open No. 2016-109766, an accumulation period and a reading period of at least two frames are required from the start of accumulation of the (n−1)th frame to the obtainment of a result of tracking detection. In the imaging surface phase difference AF method, since a time over which AF is performed is substantially equal to an accumulation period, time taken from the start of accumulation to the end of AF is lengthened in the case of continuous shooting with a slower shutter speed. As described above, the longer an interval from focus detection to focus (hereinafter referred to as AF time lag), the more difficult it is to predict the motion of an object.

SUMMARY OF THE INVENTION

The present invention has been made in view of the above-described problems, and provides an image capturing apparatus capable of improving AF prediction performance when performing continuous shooting.

According to a first aspect of the present invention, there is provided an image capturing apparatus, comprising: an image sensor having phase difference detection pixels for performing focus detection; and at least one processor or circuit configured to function as the following units: an exposure control unit configured to cause at least the phase difference detection pixels to perform a plurality of accumulations whose exposure periods are a second exposure period shorter than a first exposure period which is a target for obtaining a main image by the image sensor; and a prediction unit configured to predict an in-focus position of a subject based on signals of at least two of the phase difference detection pixels obtained in at least two accumulations out of the plurality of accumulations whose exposure periods are a second exposure period.

According to a second aspect of the present invention, there is provided an image capturing apparatus, comprising: an image sensor having phase difference detection pixels for performing focus detection; and at least one processor or circuit configured to function as the following units: an exposure control unit configured to cause at least the phase difference detection pixels to perform a plurality of accumulations whose exposure periods are a second exposure period shorter than a first exposure period which is a target for obtaining a main image by the image sensor; a comparison unit configured to compare a length of the first exposure period with a threshold; and a prediction unit configured to, based on a result of comparison by the comparison unit, select one of a signal obtained by accumulation over the first exposure period and a signal obtained by accumulation over the second exposure period, and predict an in-focus position of a subject.

According to a third aspect of the present invention, there is provided a method of controlling an image capturing apparatus provided with an image sensor having phase difference detection pixels for performing focus detection, the method comprising: causing at least the phase difference detection pixels to perform a plurality of accumulations whose exposure periods are a second exposure period shorter than a first exposure period which is a target for obtaining a main image by the image sensor; and predicting an in-focus position of a subject based on signals of at least two of the phase difference detection pixels obtained in at least two accumulations out of the plurality of accumulations whose exposure periods are the second exposure period.

According to a fourth aspect of the present invention, there is provided a method of controlling an image capturing apparatus provided with an image sensor having phase difference detection pixels for performing focus detection, the method comprising: causing at least the phase difference detection pixels to perform a plurality of accumulations whose exposure periods are a second exposure period shorter than a first exposure period which is a target for obtaining a main image by the image sensor; comparing a length of the first exposure period with a threshold; and based on a result of the comparison, selecting one of a signal obtained by accumulation over the first exposure period and a signal obtained by accumulation over the second exposure period, and predicting an in-focus position of a subject.

Further features of the present invention will become apparent from the following description of exemplary embodiments with reference to the attached drawings.

BRIEF DESCRIPTION OF THE DRAWINGS

FIG. 6 is a timing chart illustrating operation of the image capturing apparatus according to a second embodiment.

DESCRIPTION OF THE EMBODIMENTS

Figure 1:
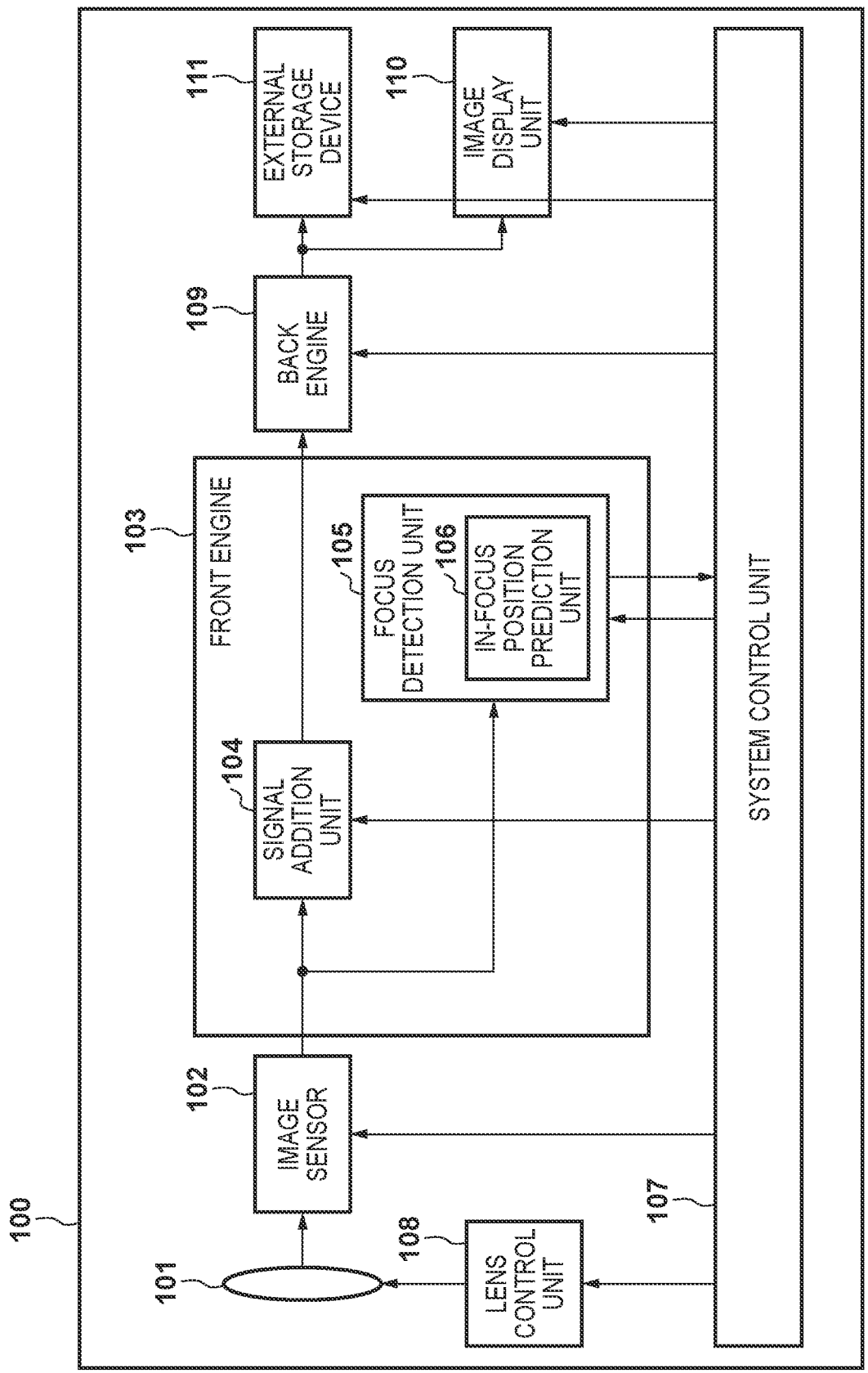
FIG. 1 is a block diagram illustrating a configuration of an image capturing apparatus according to a first embodiment of the present invention.

Hereinafter, referring to the attached drawings, embodiments of the present invention will be described in detail. In the drawings, the same members are denoted by the same reference numerals, and overlapping descriptions are omitted. The embodiments described below are illustrative, and the present invention is not limited to the configurations described in the following embodiments.

First Embodiment

FIG. 1 is a block diagram illustrating a configuration of an image capturing apparatus 100 according to a first embodiment of the present invention.

In FIG. 1, a lens unit 101 is configured by an optical lens group, which includes a focusing lens for adjusting focus, a shutter, a diaphragm, and the like, and forms an optical image on an image sensor 102. A lens control unit 108 performs various controls such as focus control with respect to the lens unit 101. The lens control unit 108 is controlled based on a command from a system control unit 107, which will be described later. In the case of an interchangeable lens type digital still camera or video camera, the system control unit 107 transmits information necessary for focus adjustment to the lens control unit 108 of the attached lens. In this manner, the image capturing apparatus 100 can adjust the focal position by controlling the attached lens.

The image sensor 102 is configured by a CMOS sensor in which unit pixel cells are arranged in a two-dimensional matrix, and photoelectrically converts a subject image formed by the lens unit 101. The configuration of the image sensor 102 will be described with reference to FIGS. 2A to 2C.

Figure 2A:
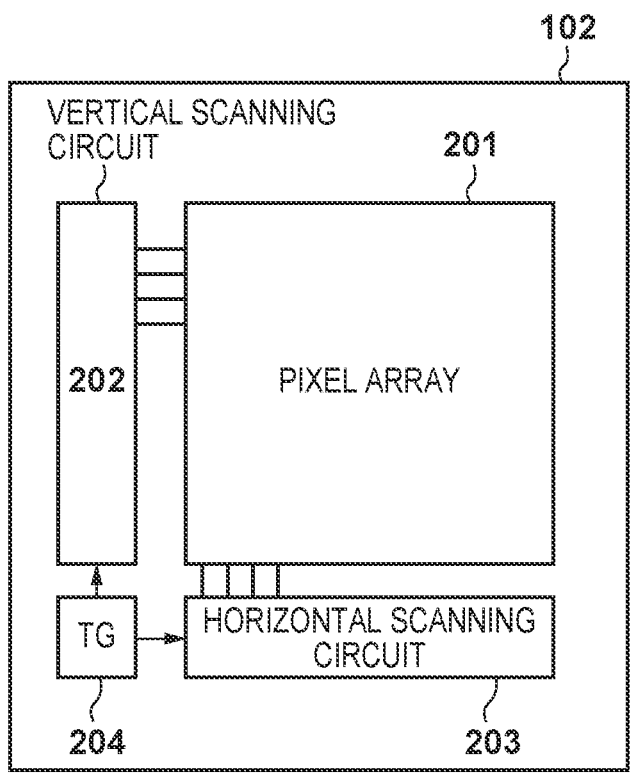
FIGS. 2A to 2C are layout views illustrating a configuration of an image sensor according to a first embodiment.
Figure 2B:
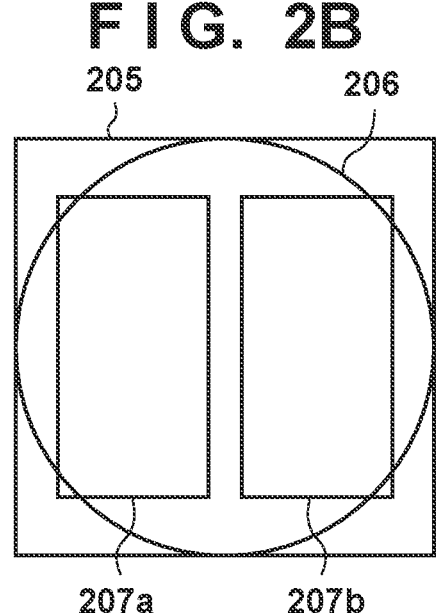
Figure 2C:
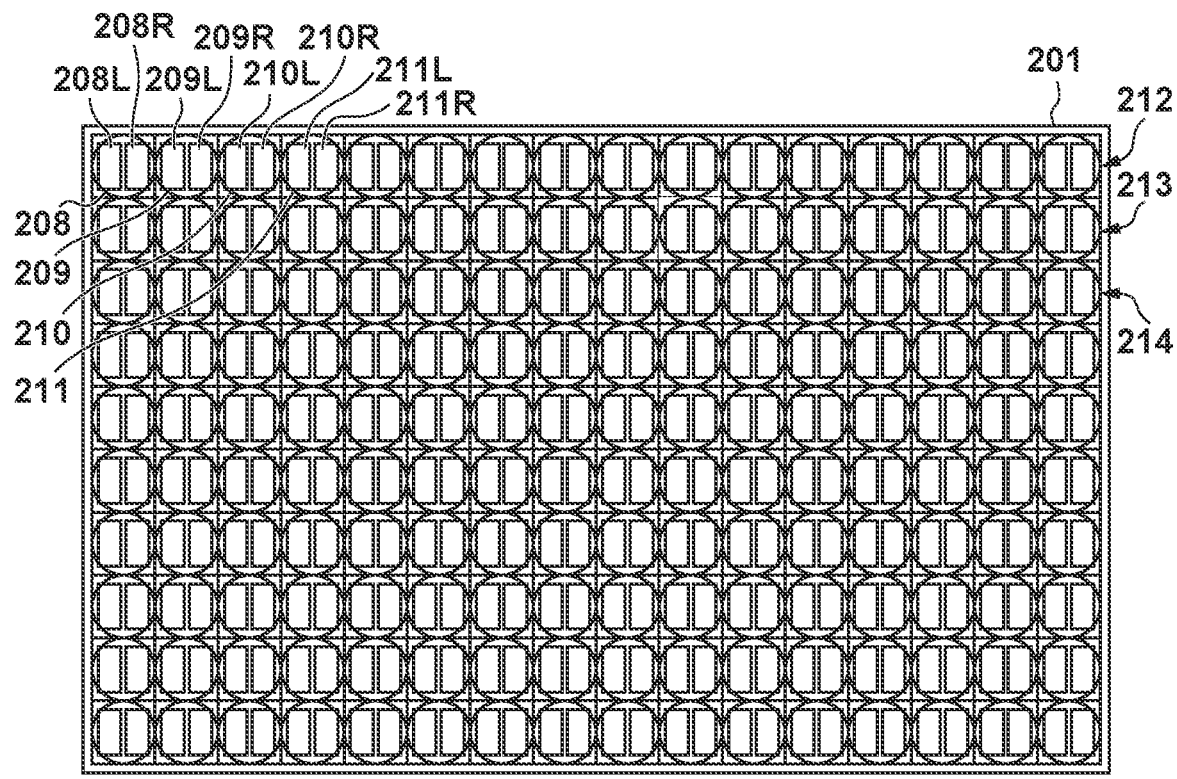

FIGS. 2A to 2C are diagrams for explaining the image sensor 102 according to the present embodiment. FIG. 2A is a diagram illustrating a configuration of the image sensor 102. The image sensor 102 is configured by including a pixel array 201, a vertical scanning circuit 202, a horizontal scanning circuit 203, and a timing generator (hereinafter, TG) 204.

The pixel array 201 is configured by arranging a plurality of unit pixel cells in a two-dimensional matrix. The TG 204 is a timing generator, generates a timing signal for controlling an image capture period, a transfer period, and the like, and transmits the timing signal to the vertical scanning circuit 202 and the horizontal scanning circuit 203. The vertical scanning circuit 202 transmits the signal output from the unit pixel cell to a vertical transmission path at the timing when the exposure period ends. The horizontal scanning circuit 203 sequentially outputs accumulated signals to the outside via an output transmission path.

FIG. 2B illustrates one unit pixel cell 205 in the image sensor 102. The unit pixel cell 205 includes one microlens 206 and a pair of photoelectric conversion units 207a and 207b. The photoelectric conversion units 207a and 207b perform pupil division by receiving luminous flux that has passed through mutually different pupil regions in the exit pupil of the imaging optical system through the common microlens 206.

FIG. 2C is a diagram illustrating a pixel array 201 in the image sensor 102. In order to provide a two-dimensional image signal, the image sensor 102 is configured by arranging a plurality of unit pixel cells 205 two-dimensionally in the row direction and the column direction. In FIG. 2C, reference numerals 208, 209, 210, and 211 each correspond to the unit pixel cell 205 illustrated in FIG. 2B. Reference numerals 208L, 209L, 210L, and 211L correspond to the photoelectric conversion unit 207a illustrated in FIG. 2B. Reference numerals 208R, 209R, 210R, and 211R correspond to the photoelectric conversion unit 207b illustrated in FIG. 2B.

Figure 3:
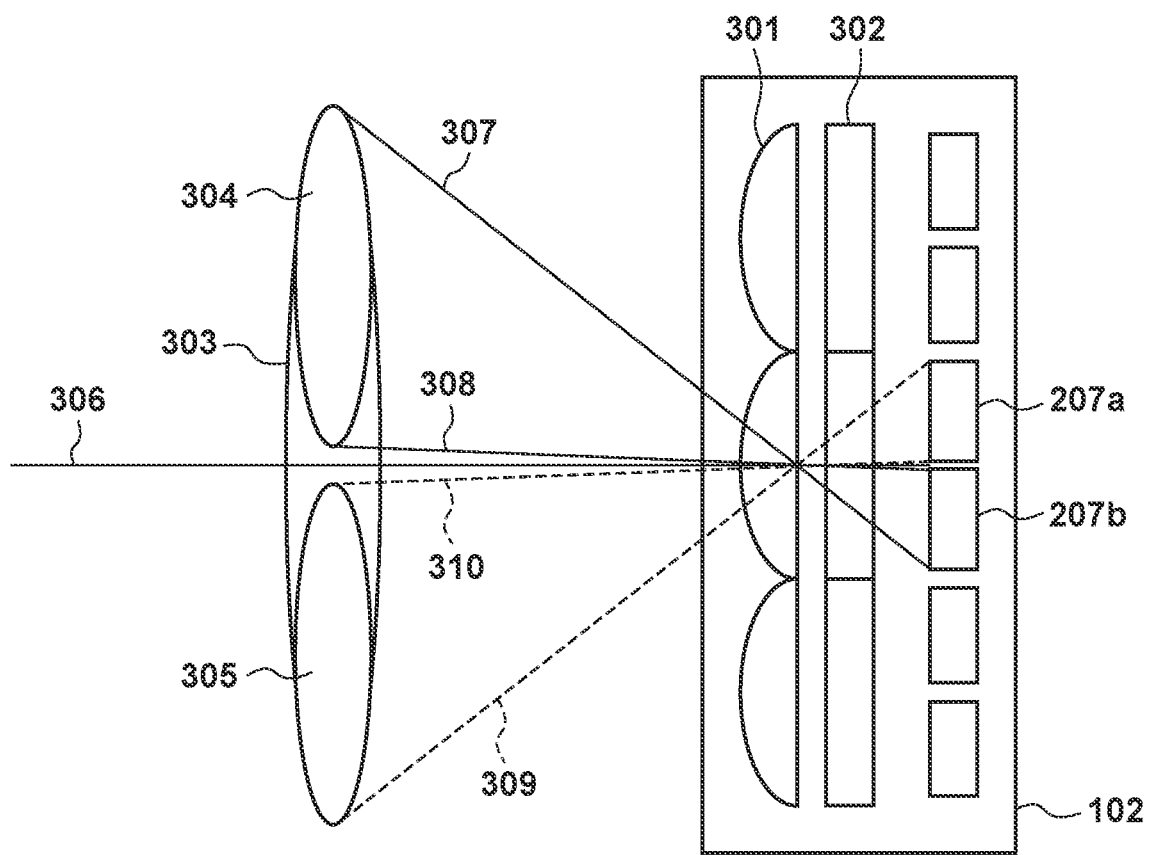
FIG. 3 is a cross-sectional view illustrating an image formation relationship of an optical image on an image sensor.

Referring to FIG. 3, the image forming relation of an optical image on the image sensor 102 having the pixel array 201 illustrated in FIGS. 2A to 2C will be described. FIG. 3 conceptually illustrates a state in which luminous flux emitted from the exit pupil of the photographing lens enters the image sensor 102. Reference numeral 301 denotes a microlens, and 302 denotes a color filter. Reference numeral 303 denotes an exit pupil of the photographing lens.

Here, the center of the luminous flux entering the pixel having the microlens 301 from the exit pupil 303 is referred to as an optical axis 306. The light emitted from the exit pupil 303 enters the image sensor 102 about the optical axis 306. Reference numerals 304 and 305 denote partial regions of the exit pupil 306. Outermost rays of light passing through the partial region 304 of the exit pupil are denoted by 307 and 308, and outermost rays of light passing through the partial region 305 of the exit pupil are denoted by 309 and 310.

As can be seen from FIG. 3, of the luminous flux emitted from the exit pupil, the luminous flux on the upper side is incident on the photoelectric conversion unit 207b and the luminous flux on the lower side is incident on the photoelectric conversion unit 207a with the optical axis 306 as a boundary. That is, the photoelectric conversion units 207a and 207b respectively receive light of different regions of the exit pupil of the photographing lens. The phase difference detection is performed by utilizing this characteristic. Hereinafter, the phase difference detection method according to the present embodiment will be described with reference to FIG. 2C.

The photoelectric conversion units 207a in the plurality of unit pixel cells 205 are used as an A-image pixel group for photoelectric conversion of an A image among a pair of subject images for focus detection in accordance with a phase difference detection method. The photoelectric conversion units 207b are used as a B-image pixel group for photoelectrically converting a B image, from among the pair of subject images.

In the pixel array 201 illustrated in FIG. 2C, a row 212 for which the photoelectric conversion units 208L to 211L . . . are referred to is an A-image pixel group, and a row 213 for which the photoelectric conversion units 208R to 211R . . . are referred to is a B-image pixel group. Phase difference information can be detected by calculating a correlation between data obtained from the A-image pixel group and data obtained from the B-image pixel group. Rows, like the row 212 and the row 213, for outputting a phase difference signal to the focus detection unit 105 are referred to as phase difference detection pixel rows. The AF for performing focus detection of the phase difference detection method using the A-image pixel group and the B-image pixel group provided in the image sensor as described above is referred to as imaging surface phase difference AF. In a row 214, an image signal can be read out by adding the signal of the photoelectric conversion unit 207a and the signal of the photoelectric conversion unit 207b of each unit pixel cell 205. A row in which only pixels for outputting an image signal to a signal addition unit 104 are arranged as in the row 214 is called a normal pixel row. Note that the unit pixel cells 205 in a normal pixel row may have a configuration of having only one photoelectric conversion unit without having divided photoelectric conversion units.

The phase difference detection method is a known technique, and a phase difference detection method other than the method described above may be used. For example, configuration may be taken to arrange a focus detection pixel having a light shielding portion under a microlens for performing pupil division, and form image signals of a pair of subject images by combining outputs of two types of focus detection pixels having different aperture positions of the light shielding portion.

The front engine 103 is a first signal processing unit that processes a signal outputted from the image sensor 102. The image sensor 102 performs exposure (exposure control) a plurality of times in an exposure period which is shorter than an exposure period (hereinafter, referred to as a main image exposure period) that is a target set by the user or the system control unit 107 when shooting is performed, and outputs a signal to the front engine 103. An image signal exposed in this short exposure period is referred to as a short exposure image. The front engine 103 performs control such as adding together (combining) short exposure images, focus detection, and the like. The front engine 103 processes an image signal transmitted from the image sensor 102 at a high frame rate, and outputs the processed image signal to a back engine 109, which will be described later, at a low frame rate.

The signal addition unit 104 adds together short exposure images outputted from the image sensor 102 a plurality of times, and outputs a result thereof to the back engine 109 as one image signal (hereinafter, referred to as a main image signal) obtained by exposing the image sensor 102 for the main image exposure period.

The focus detection unit 105 performs focus detection based on signals from the A-image pixel group and the B-image pixel group of the image sensor 102. Specifically, the correlation calculation is performed to obtain the phase difference between an A-image pixel signal and a B-image pixel signal. After that, the focus detection unit 105 obtains a defocus amount from a result of the correlation calculation.

The in-focus position prediction unit 106 predicts a subject distance using the short exposure image signal output from the image sensor 102. A known method may be used as a method for predicting the subject distance. For example, using an approximation method such as least squares approximation, an approximation expression is calculated based on the time at which past focus detection was performed and the in-focus position at that time, and a predicted value of the in-focus position is obtained. It is possible to obtain the predicted value of the in-focus position from the time at which the image is next obtained and the approximation expression. Further, in the prediction calculation, the narrower the interval at which the samples used for prediction are obtained, the higher the accuracy of the obtained prediction expression and the prediction result. In the present embodiment, since in-focus position prediction is performed using short exposure images having a shorter shooting interval as compared with the prior art, the in-focus position prediction may be performed from a prediction expression obtained by a Lagrangian interpolation formula or the like.

The back engine 109 is a second signal processing unit that performs known signal processing such as color conversion processing and white balance processing on an input signal. The image signal, after having been subjected to various signal processing, is compressed and encoded by a compression means (not illustrated) and output to an external storage device 111 and an image display unit 110.

The system control unit 107 controls the entire image capturing apparatus 100. Based on a shooting information obtained from a shooting scene, a shooting mode, or the like, information for driving the optical system such as the zoom, the diaphragm, and the like is transmitted to the lens control unit 108, and information for driving the image sensor such as the exposure period, a readout interval, and the like is transmitted to the image sensor 102. Further, based on focus detection information obtained from the focus detection unit 105 and the in-focus position prediction unit 106, information such as a driving amount for the focus lens is transmitted to the lens control unit 108.

Figure 4:
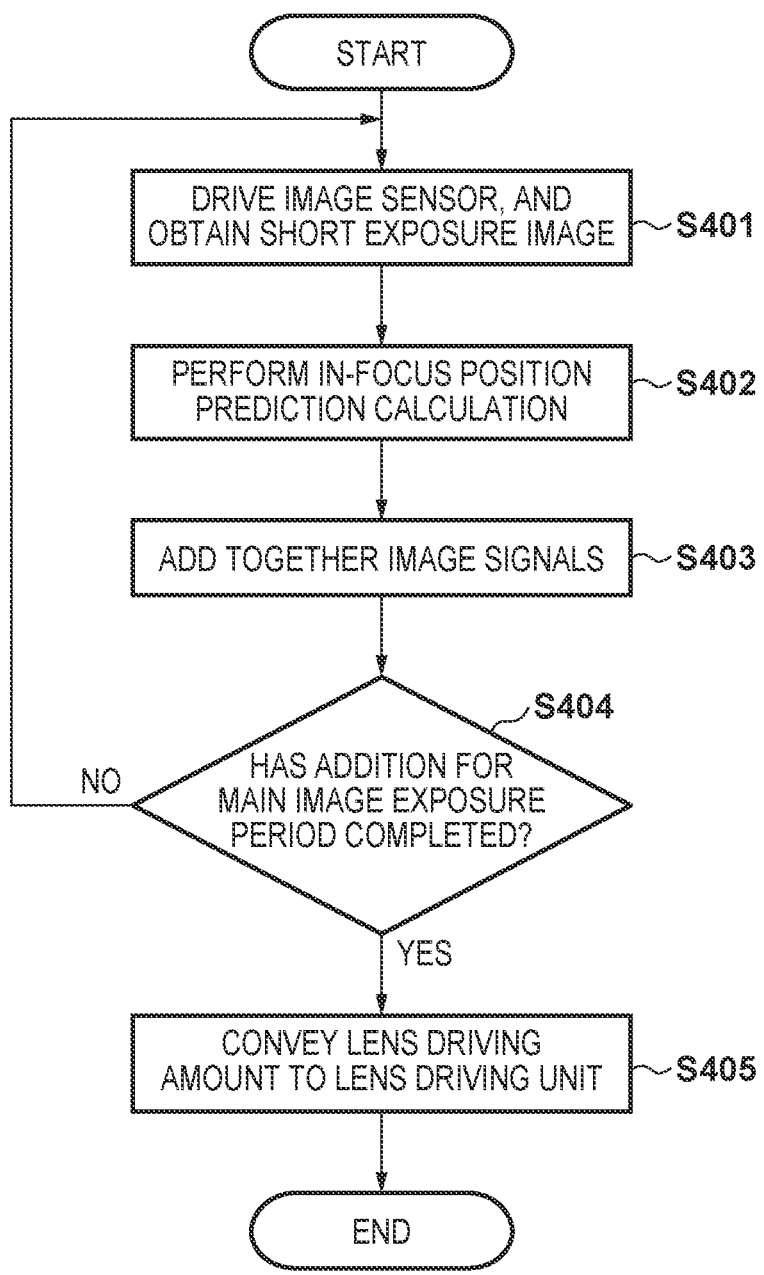
FIG. 4 is a flowchart illustrating operation of the image capturing apparatus according to the first embodiment.

Operation of the image capturing apparatus 100 according to the present embodiment will be described with reference to FIG. 4. FIG. 4 is a flowchart illustrating operation of the image capturing apparatus of the present embodiment. The process of the flowchart of FIG. 4 is started when a shutter button included in an operation unit (not illustrated) is pressed by a user.

In step S401, the system control unit 107 drives the image sensor 102 to obtain a short exposure image. In step S402, the system control unit 107 causes the in-focus position prediction unit 106 to perform an in-focus position prediction calculation using the obtained short exposure image. Then, a lens driving amount required to drive the lens to the predicted position is calculated.

In step S403, the system control unit 107 causes the signal addition unit 104 to perform addition of short exposure images. Note that step S402 and step S403 may be performed in parallel.

In step S404, it is determined whether or not the sum of the short exposure image signals have been added together so as to coincide with the main image exposure period. If the short exposure image signals for the main image exposure period have not been added together, the process returns to step S401 to repeat the operation of step S401 to step S404. When the short exposure image signals for the main image exposure period have been added together, the process proceeds to step S405. In step S405, the lens driving amount obtained in step S402 is transmitted to the lens control unit 108. The timing of lens driving will be described later.

The image display unit 110 displays an image based on the image signal transmitted from the back engine 109, an operation screen (a menu screen) for operating the image capturing apparatus 100, and the like on a display device such as a liquid crystal display, an organic EL display, and the like. The external storage device 111 stores an inputted image on a memory card which is typified by an SD card. Here, a storage medium may be detachable from the image capturing apparatus or may be incorporated in the image capturing apparatus.

Figure 5:
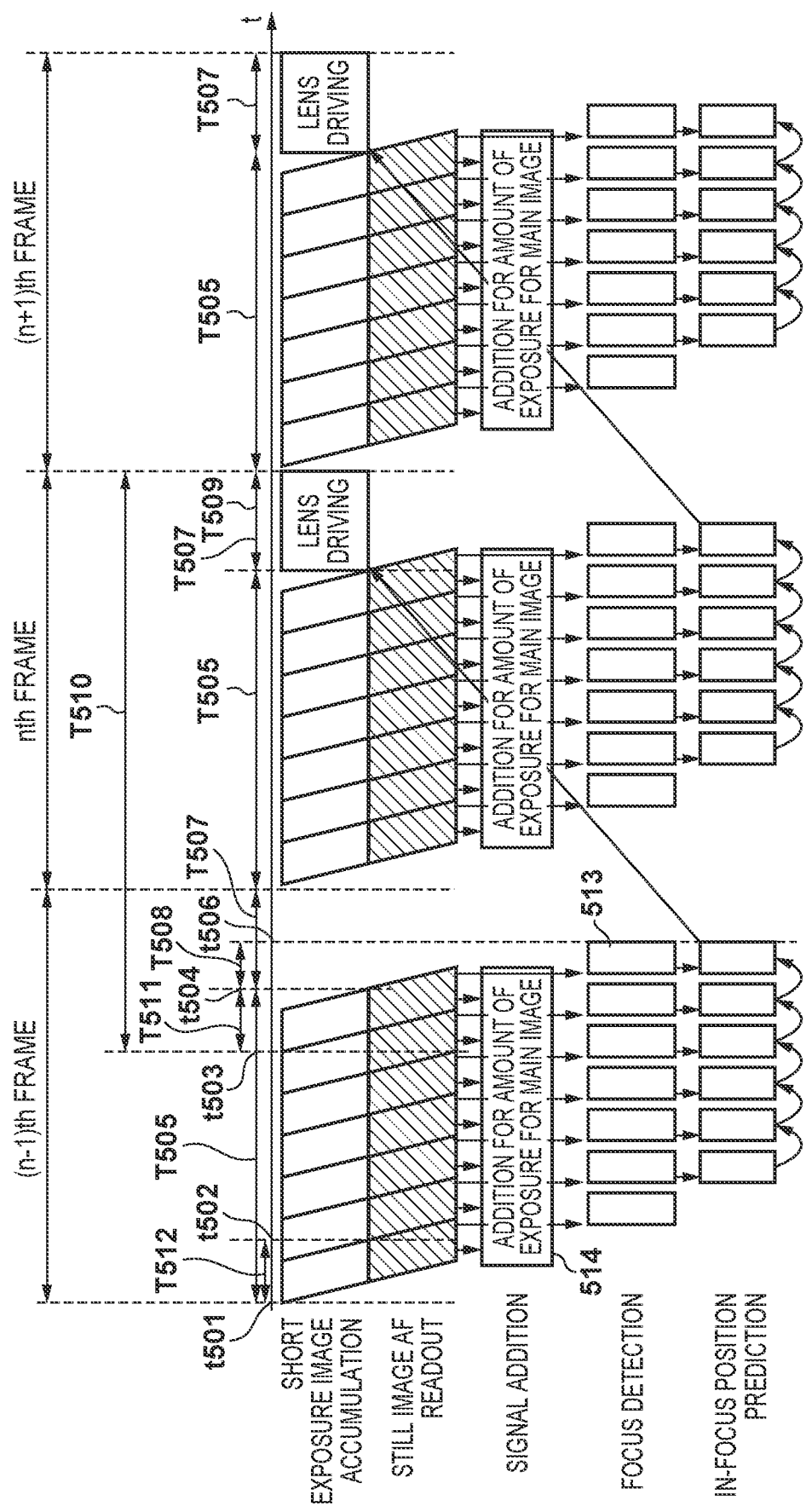
FIG. 5 is a timing chart illustrating operation of the image capturing apparatus according to the first embodiment.

Next, FIG. 5 is an operation timing chart of the image capturing apparatus 100 according to the present embodiment. In the present embodiment, an example in which a signal of the image sensor 102 is read out by the slit rolling shutter method will be described. With the slit rolling shutter method, since signals are sequentially read out from pixel rows in which exposure is complete, the interval for obtaining short exposure images is narrowed. In the present embodiment, the in-focus position prediction is performed using at least two short exposure images. The shorter the interval at which the short exposure image is obtained, the smaller the loss of information when the short exposure image are added together to obtain the main image, which is preferable.

The horizontal axis in FIG. 5 represents time t. The vertical axis represents an operation of the image capturing apparatus 100. In addition, a case where three frames of the main image signal are continuously shot will be described as an example. Let the current frame be the nth frame, let the previous frame be the (n−1)th frame, and let the next frame be the (n+1)th frame.

t501 is an accumulation start time of the first short exposure image. t502 is an accumulation end time of the first short exposure image. T512 is a period from t501 to t502, and is an accumulation period of a short exposure image. Short exposure images are exposed a plurality of times by the image sensor 102 until there is exposure for the main image exposure period, and the short exposure images are added together by the signal addition unit 104. Reference numeral 513 denotes accumulated short exposure images.

A region indicated by the hatched lines in FIG. 5 is a readout time for a still image and an AF signal. In FIG. 5, short exposure images are accumulated until t504. The period from t501 to t504 is substantially the same as the exposure period of the main image signal, and this period is defined as T505. Reference numeral 514 denotes a main image exposure signal obtained by adding a plurality of short exposure images together. t503 indicates an exposure start time of the last short exposure image used for predicting the in-focus position in the (n−1)th frame.

In the "focus detection" of FIG. 5, the focus detection unit 105 performs a correlation calculation using the phase difference signal obtained from the short exposure image signals, and calculates a defocus amount. In the "in-focus position prediction" of FIG. 5, the in-focus position prediction unit 106 uses the phase difference signal obtained at the time of the short exposure image accumulation to predict the in-focus position at the time of the next short exposure image accumulation. The in-focus position prediction is performed every time a short exposure image signal is obtained, and a predicted position is obtained separately. Since the predicted position calculation can be performed at shorter intervals than when predicted position information is obtained using the main image signal, the accuracy of the prediction calculation can be improved. When the main image signal is obtained, the in-focus position prediction unit 106 terminates the in-focus position prediction, and transmits a lens driving amount for the lens control unit 108 to move the lens to the predicted position to the lens control unit 108 through the system control unit 107.

In the present embodiment, the timing at which the lens is driven based on the obtained lens driving amount is after the main image signal of the next frame is obtained. This is to narrow T507 which is a non-exposure period from the completion of exposure of the main image to the start of exposure of the main image of the subsequent frame, thereby improving the continuous shooting speed.

In a case where, after the end of the last in-focus position prediction calculation of one frame, lens driving is performed prior to the start of the main image exposure of the subsequent frame using the lens driving amount obtained in the frame, the non-exposure period T507 of the main image would incur the in-focus position prediction calculation time T508 and the lens driving time T509.

However, if lens driving is performed in the (n+1)th frame based on the lens driving amount obtained in the nth frame as in the present embodiment, the lens driving in the nth frame can be performed at a timing that overlaps with the in-focus position prediction calculation in the (n+1)th frame. In this case, the non-exposure period T507 depends on the lens driving time T509. Therefore, the non-exposure period T507 in the present embodiment can be shortened by the amount of T508 as compared with the case where lens driving is performed prior to the start of exposure of the (n+1)th frame after the end of the last in-focus position prediction calculation of the nth frame. In such a case, from FIG. 5, the AF time lag T510 is calculated as follows.

$$\text{AF time lag } T510 = T507 \times 2 + T505 + T511 \qquad \text{(Equation 1)}$$

T511 is the exposure period of the last short exposure image used for predicting the in-focus position, and indicates the period from t503 to t504. Since the T511 is an exposure period that is shorter than the main image exposure period T505, the AF time lag can be shortened as compared with a case where the main image exposure period T505 takes two frames to predict the in-focus position. By shortening the AF time lag, the AF prediction performance at the time of continuous shooting is improved.

As described above, according to the present embodiment, the AF time lag can be shortened by performing an in-focus position prediction using image signals whose exposure periods are shorter than the exposure period of a main image signal. AF prediction performance at the time of continuous shooting can thus be improved.

A timing of the lens driving may be after the last in-focus position prediction calculation of the n-th frame is completed. In this case, since the non-exposure period T507 becomes longer as described above, it is difficult to increase the continuous shooting speed, but the AF time lag can be shortened because the lens driving is performed immediately after the in-focus position prediction calculation.

In the present embodiment, short exposure images are added a plurality of times to obtain the main image signal, but another method may be used. For example, as in a sensor capable of multi-stream output, configuration may be taken such that the phase difference detection pixel row and the main image pixel row are independently read out and output to a signal processing unit. The main image signal obtained by adding together the signals of the photoelectric conversion units 207*a* and 207*b* from the main image pixel rows is read out at a low frame rate. The phase difference detection pixel row separately outputs a frame for outputting a phase difference signal and a frame for outputting a main image signal. Further, the main image signal of the phase difference detection pixel row may be interpolated by signals of surrounding main image pixel rows, without outputting the main image signal. By reading out the phase difference detection pixel signal at a high frame rate while reading out the main image signal at a low frame rate, the in-focus position prediction calculation can be performed before obtaining the main image signal.

Further, as typified by a SPAD sensor, a configuration may be adopted in which a counter is provided in a sensor and short exposure image signals are read out at intervals shorter than the main image exposure period. The SPAD sensor has a counter and a 1-bit A/D converter for each pixel, and measures an amount of light by counting a number of pulses generated for each incidence of photons. Therefore, an image signal can be read out as a digital signal at an arbitrary timing at which the image sensor is exposed. Since the signal value is accumulated during the main image exposure period, one short exposure image can be obtained by taking the difference between the signal at the exposure start timing of the short exposure image and the signal at the exposure completion timing of the short exposure image. In this manner, the main image signal can be obtained while outputting the short exposure image signal.

In the present embodiment, the image sensor 102 has been described as a CMOS sensor that employs the slit rolling shutter method, but a CCD sensor may be used. When the CCD sensor is used, since a slit rolling shutter operation cannot be performed, an interval at which a short exposure image signal is obtained becomes long, but there is also an advantage that the rolling distortion generated in a slit rolling shutter operation does not occur.

Second Embodiment

Next, a second embodiment of the present invention will be described. In the first embodiment, the phase difference signals are read out from all the short exposure images to perform the in-focus position prediction calculation, but the number of times of performing the in-focus position prediction calculation may be thinned out. When the in-focus position prediction is performed using a plurality of images, it is desirable that prediction intervals be equal. The present embodiment differs from the first embodiment, which performs the in-focus position prediction using all the short exposure images, in that the number of times that the in-focus position prediction calculation is performed is reduced (thinning). Since other configurations in the present embodiment are the same as those in the first embodiment, their descriptions are omitted.

Figure 7A:
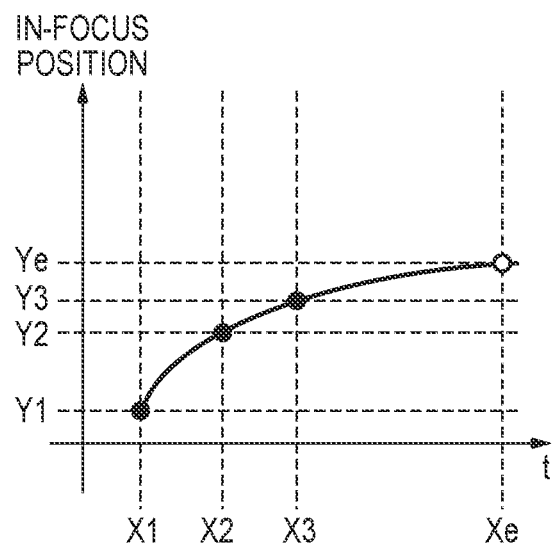
FIGS. 7A and 7B are diagrams illustrating an example of an in-focus position prediction calculation in the second embodiment.
Figure 7B:
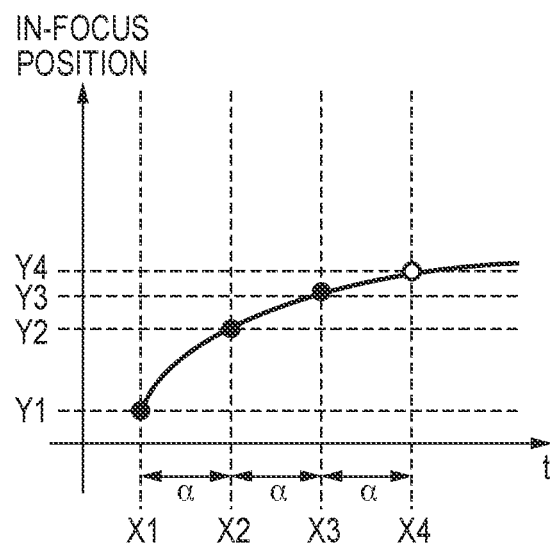

Operation of the image capturing apparatus 100 according to the present embodiment will be described with reference to FIG. 6. FIG. 6 is a timing chart that illustrates operation of the image capturing apparatus 100 according to the present embodiment. In the present embodiment, in a period in which one main image signal is obtained, phase difference information is read out from only two short exposure images that are necessary for performing an in-focus position prediction calculation. In addition, the readout times of the phase difference information are set to be at equal intervals. By performing the in-focus position prediction calculation at equal intervals, the predicted position can be obtained by a simple equation. FIGS. 7A and 7B are used to describe a case where the in-focus position is predicted by a quadratic equation using a Lagrangian interpolation, for example.

FIGS. 7A and 7B illustrates examples of an in-focus position prediction calculation. The horizontal axis represents time, and the vertical axis represents an in-focus position of a subject at a certain time. FIG. 7A illustrates the in-focus position and the time when the readout interval of short exposure images is not at equal intervals. FIG. 7B illustrates the in-focus position and the time when the readout interval of short exposure images is at equal intervals. In FIG. 7A, when the times at which short exposure images are obtained are X1 to X3, respectively, and the in-focus positions at which the short exposure images are obtained are Y1 to Y3, respectively, the in-focus position Ye at the time Xe at which the lens is driven can be predicted from a Lagrangian interpolation formula as follows.

$$Ye=(Xe-X2)\cdot(Xe-X3)\cdot Y1/\{(X1-X2)\cdot(X1-X3)\}+(Xe-X1)\cdot(Xe-X3)\cdot Y2/\{(X2-X1)\cdot(X2-X3)\}+(Xe-X1)\cdot(Xe-X2)\cdot Y3/\{(X3-X1)\cdot(X3-X2)\}$$ (Equation 2)

Here, as illustrated in FIG. 7B, when intervals for reading three short exposure images used for the in-focus position prediction are set to equal intervals ($\alpha$), the predicted position Ye can be obtained as follows. The interval $\alpha$ is a power of 2.

$$Ye=(\frac{1}{2}\alpha^2)\{(Xe-X2)(Xe-X3)Y1-2(Xe-X1)(Xe-X3)Y2+(Xe-X1)(Xe-X2)Y3\}$$ (Equation 3)

When three short exposure images used for the in-focus position prediction calculation are obtained at unequal intervals, division is necessary as in Equation 2, but when short exposure images are obtained at equal intervals which is a power of 2 as in the present embodiment, the predicted position can be obtained by simple shift calculation instead of division as in Equation 3. In this manner, by reading out short exposure image signals used for the in-focus position prediction at equal intervals, it is possible to simplify the calculation.

Further, in the present embodiment, it is difficult to cope with a sharp change of a subject as compared with the case where the phase difference signal is read out from all the short exposure images, but it is possible to suppress power consumption. For example, a traveling train is often traveling at a constant speed except when departing or arriving. When it is known in advance that the movement of a subject does not change sharply in this manner, power consumption can be suppressed by performing the operation of the present embodiment.

Further, in order to equalize the interval of the in-focus position prediction calculation, the interval of continuous shooting may be adjusted by shifting the lens driving timing or the like. By adjusting the interval of continuous shooting in this manner, it is possible to perform the in-focus position prediction calculation at equal intervals and simplify the in-focus position prediction calculation.

Further, for thinned-out short exposure images for which a phase difference signal is not read out, an image signal may be read out from the phase difference detection pixel row and output to the signal addition unit 104. When a phase difference signal is output from a phase difference detection pixel row, image information of the row is lost. Even if the image information is interpolated by using a normal pixel row around the phase difference detection pixel row in order to compensate for the deficiency of the image information, image quality deterioration such as false color may occur. Therefore, when a phase difference signal is not read out, the phase difference detection pixel row may add together the signals of the photoelectric conversion units 207a and 208b of each phase difference detection pixel and output the result, as a signal for the main image, to the signal addition unit 104.

Third Embodiment

Next, a third embodiment of the present invention will be described. The number of times that the in-focus position prediction calculation is performed is reduced (thinned) at equal intervals in the second embodiment, but thinned-out intervals may be made to be uneven intervals. The present embodiment differs from the second embodiment in that, among short exposure images obtained while obtaining one main image signal, short exposure images thinned out at unequal intervals are used for prediction of the in-focus position. Since other configurations in the present embodiment are the same as those in the first and second embodiments, their descriptions are omitted.

Figure 8:
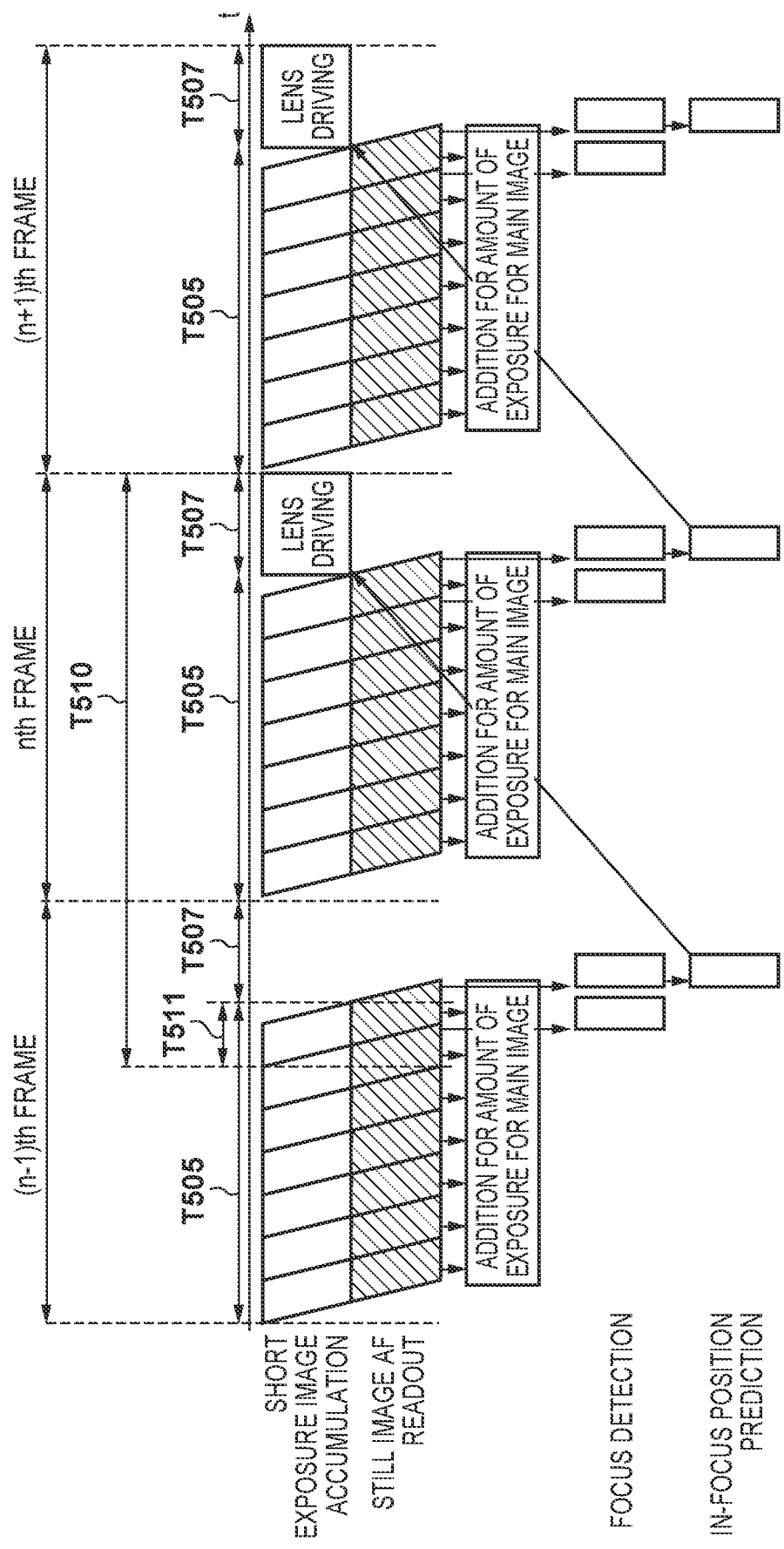
FIG. 8 is a timing chart illustrating operation of the image capturing apparatus according to a third embodiment.

Operation of the image capturing apparatus 100 according to the present embodiment will be described with reference to FIG. 8. FIG. 8 is a timing chart that illustrates operation of the image capturing apparatus 100 according to the present embodiment. In the present embodiment, in a period in which one main image signal is obtained, phase difference information is read out from only two short exposure images that are necessary for performing an in-focus position prediction calculation. In addition, readout timings of phase difference information, in a period in which one main image signal is obtained, two short exposure images are selected, including the short exposure image last obtained. It is envisioned that a movement speed of the subject changes during the main image exposure period. In one main image exposure period, by performing the in-focus position prediction calculation using the last obtained short exposure image, it becomes possible to predict the in-focus position on the basis of the movement speed at a timing close to the time at which lens driving is performed.

In this manner, in a period in which a main image signal is obtained, by performing the in-focus position prediction using a short exposure image signal that is close to the next frame, it is possible to suppress power consumption as compared with the first embodiment while maintaining an AF time lag equivalent to that of the first embodiment.

Fourth Embodiment

Next, a fourth embodiment of the present invention will be described. In the third embodiment, in order to perform an in-focus position prediction calculation, a short exposure image last obtained in a main image exposure period is used. However, a short exposure image at a timing at which it is possible to complete the in-focus position prediction calculation during the main image exposure period may be used. The present embodiment differs from the first to third embodiments in that, among short exposure images obtained during one main image exposure period, a short exposure image at a timing at which the in-focus position prediction calculation can be completed during the main image exposure period is used for an in-focus position prediction. Since other configurations in the present embodiment are the same as those in the first through third embodiments, their descriptions are omitted.

Figure 9:
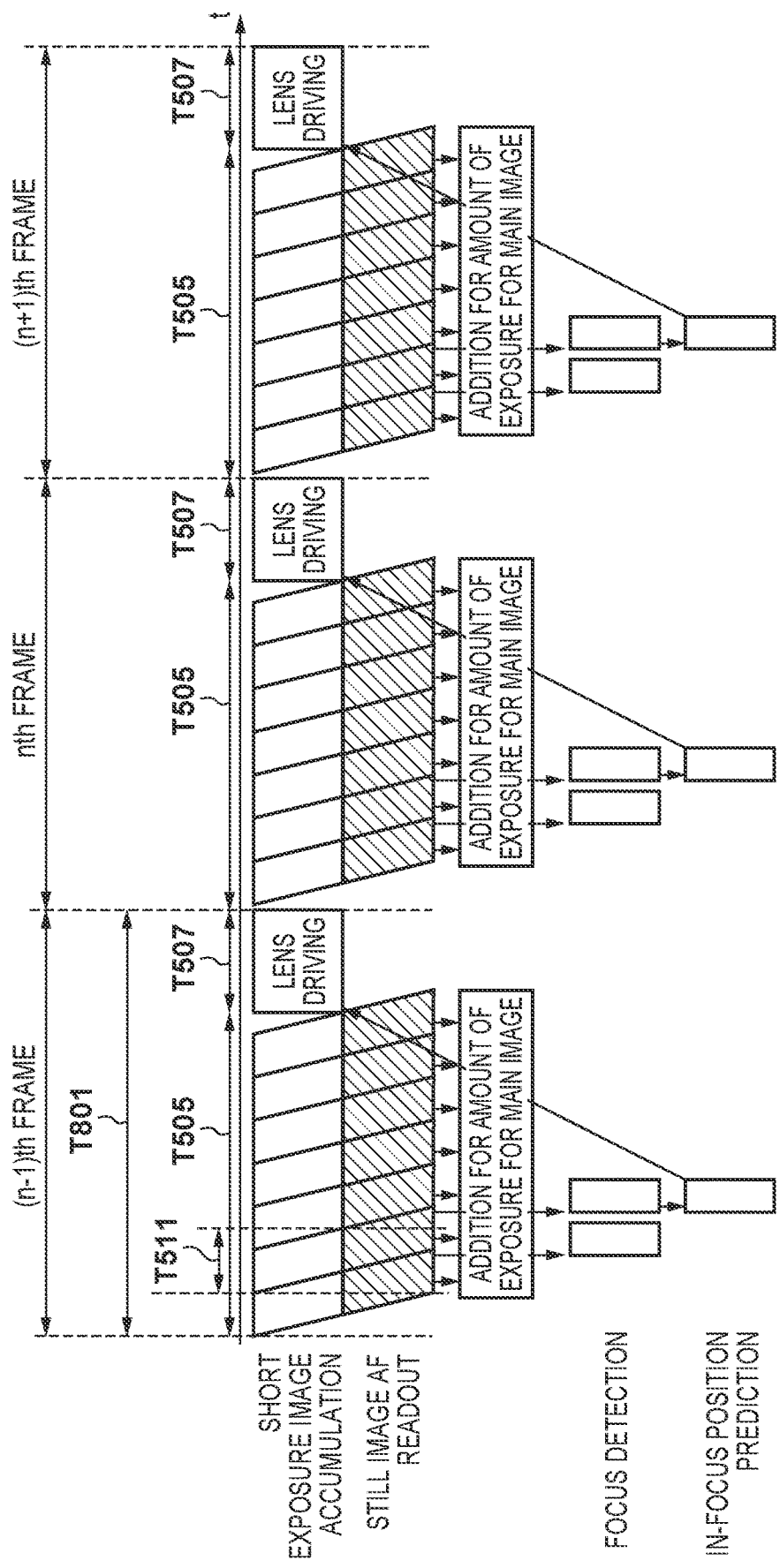
FIG. 9 is a timing chart illustrating operation of the image capturing apparatus according to a fourth embodiment.

Operation of the image capturing apparatus 100 according to the present embodiment will be described with reference to FIG. 9. FIG. 9 is a timing chart that illustrates operation of the image capturing apparatus 100 according to the present embodiment. In the present embodiment, in a period in which one main image signal is obtained, phase difference information is read out from only two short exposure images that are necessary for performing an in-focus position prediction calculation. In addition, for readout timings of phase difference information, in a period in which one main image signal is obtained, two short exposure images at timings at which the in-focus position prediction calculation ends inside the main image exposure period are selected.

In the first to third embodiments, since the timing of the in-focus position prediction calculation in the nth frame main image signal is after the accumulation time of the main image signal, the timing of performing lens driving is set before the start of exposure of the (n+1)th frame main image signal, in consideration of the continuous shooting speed of the main image. In the present embodiment, by using short exposure images of the first half in the main image exposure period, the in-focus position prediction calculation can be completed before the main image exposure period ends. Therefore, even if the lens driving timing is immediately after the current main image signal is obtained, the continuous shooting interval of the main image can be narrowed. In such a case, from FIG. 9, the AF time lag T801 is calculated as follows.

$$\text{AF time lag } T801 = T507 + T505 \quad \text{(Equation 4)}$$

In this manner, in a period in which the main image signal is obtained, it is possible to shorten the AF time lag and improve the AF prediction performance by performing the in-focus position prediction calculation using short exposure images of the first half and performing lens driving after the current main image signal is obtained.

Fifth Embodiment

Next, a fifth embodiment of the present invention will be described. In the first to fourth embodiments, the timing of lens driving is set to the non-exposure period in an interim of continuous shooting, but lens driving may be performed during the main image exposure period. The present embodiment is different from the first to fourth embodiments in that the lens control unit 108 is constantly controlled to perform lens driving, and the lens driving information is updated as soon as the lens driving information is obtained from the in-focus position prediction unit 106. Since other configurations in the present embodiment are the same as those in the first through fourth embodiments, their descriptions are omitted.

Figure 10:
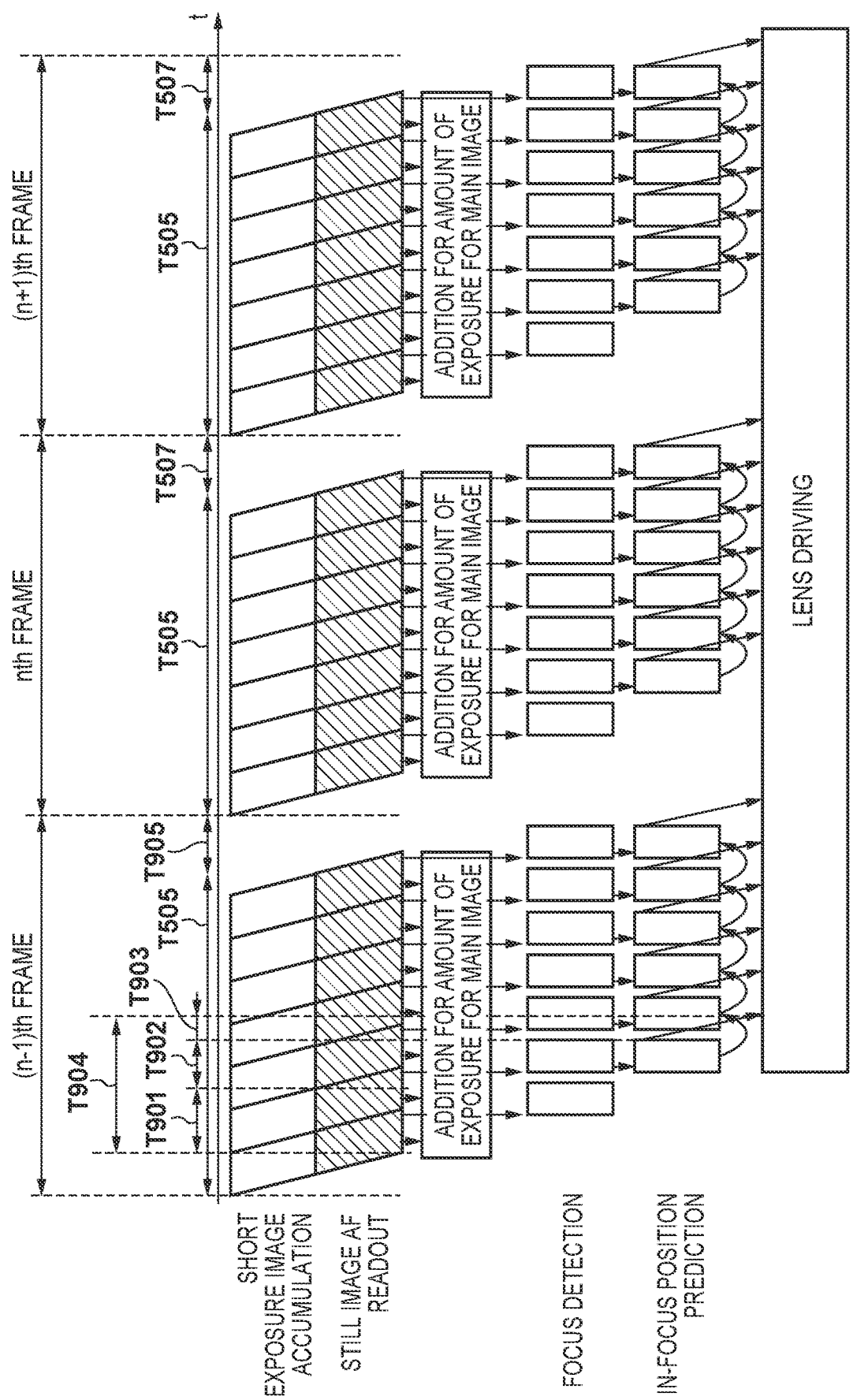
FIG. 10 is a timing chart illustrating operation of the image capturing apparatus according to a fifth embodiment.

Operation of the image capturing apparatus 100 according to the present embodiment will be described with reference to FIG. 10. FIG. 10 is a timing chart that illustrates operation of the image capturing apparatus 100 according to the present embodiment. In the present embodiment, the lens control unit 108 is constantly controlled to perform lens driving, and the lens driving information is updated when an in-focus position prediction calculation is completed.

T901 is an accumulation period of the second short exposure image used for the first in-focus position prediction calculation of the first frame. T902 is an amount of time taken for the in-focus position prediction calculation. As soon as an in-focus position prediction calculation is completed and a lens drive amount is obtained, the in-focus position prediction unit 106 transmits the lens drive amount, which is for the lens control unit 108 to move the lens to the predicted position, to the lens control unit 108 through the system control unit 107, and updates the lens driving information.

T903 is an amount of time taken until the in-focus position prediction calculation is completed and the lens driving information is updated. In such a case, the AF time lag T904 is calculated as follows.

$$\text{AF time lag } T904 = T901 + T902 + T903 \quad \text{(Equation 5)}$$

As can be seen from FIG. 10, since T904 is shorter than the main image exposure period T505, the AF time lag is shorter than that in the case of the first to fourth embodiments. In addition, since the in-focus position prediction calculation and the lens driving are performed at short intervals, the lens driving amount for the lens control unit 108 to move the lens to the predicted position is likely to be small. Therefore, the amount of time required for driving the lens in accordance with one piece of lens driving information is shorter than in the first to fourth embodiments.

In this manner, it is possible to shorten the AF time lag and improve the AF prediction performance as compared with the configurations described in the first to fourth embodiments by performing lens driving point by point during the main image exposure period to perform focusing.

In addition, a selection unit capable of selecting an operation described in the first to fifth embodiments may be provided so that operation can be selected according to a user setting. For example, the operation of the first embodiment may be used when desiring to perform highly accurate in-focus position prediction such as with sport photography, and the operation of the third embodiment may be used when desiring to reduce power consumption.

Sixth Embodiment

Next, a sixth embodiment of the present invention will be described. In the first to fifth embodiments, the in-focus position prediction calculation is performed using short exposure image signals, but the main image signal may be selected and used in accordance with the exposure time of the main image signal. When continuous shooting is performed in a state in which the main image exposure period is set to be as short as in normal still image shooting, sufficient AF prediction accuracy may be obtained even if in-focus position prediction is performed using the main image signal. The present embodiment differs from the first to fifth embodiments in that a short exposure image and a main image signal are selectively used as image signals used for the in-focus position prediction.

Figure 11:
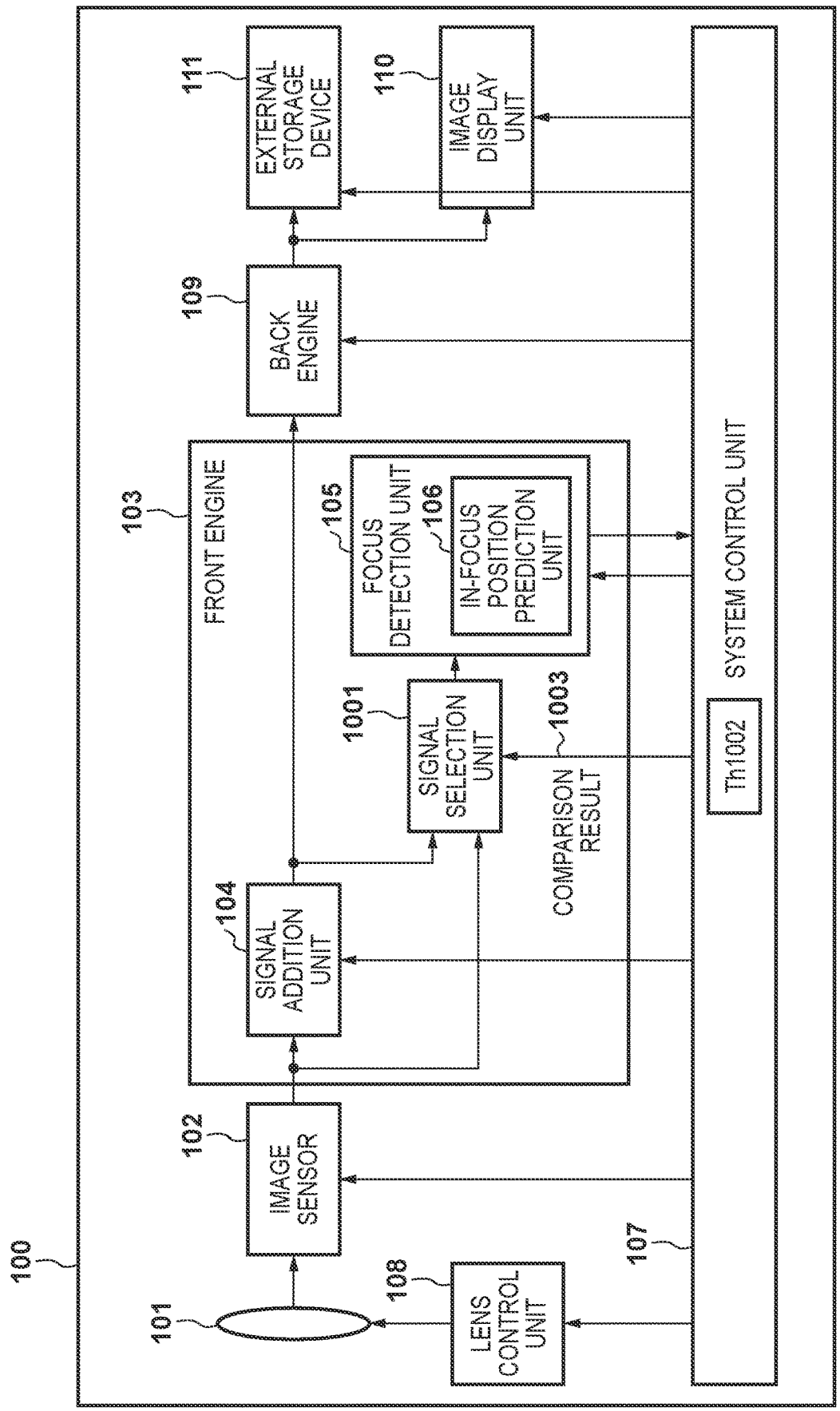
FIG. 11 is a block diagram illustrating a configuration of an image capturing apparatus according to a sixth embodiment.

Operation of the image capturing apparatus 100 according to the present embodiment will be described with reference to FIG. 11. FIG. 11 is a diagram illustrating a configuration of the image capturing apparatus 100 of the present embodiment. Compared to FIG. 1, a signal selection unit 1001 and a threshold Th 1002 are added. The system control unit 107 compares the main image exposure period with the threshold Th 1002, and transmits a comparison result 1003 to the signal selection unit 1001.

Based on the comparison result 1003, the signal selection unit 1001 selects and outputs a short exposure image signal or a main image signal outputted from the image sensor 102. When the main image exposure period is greater than or equal to the threshold Th 1002 (greater than or equal to a threshold), it is determined that the AF prediction performance will improve by performing the in-focus position prediction calculation using a short exposure image signal, and the short exposure image signal is outputted. When the main image exposure period is shorter than the threshold Th 1002, it is determined that adequate AF prediction accuracy can be obtained even if the in-focus position prediction calculation is performed using the main image signal, and the main image signal is outputted.

In this way, it is possible to suppress power consumption as compared with the case where the in-focus position prediction calculation is performed a plurality of times using short exposure image signals. Note that the main image exposure period and the threshold Th 1002 may be passed to the signal selection unit 1001, and the comparison may be performed by the signal selection unit 1001.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-232836, filed Dec. 12, 2018, which is hereby incorporated by reference herein in its entirety.

What is claimed is:

1. An image capturing apparatus, comprising:
   an image sensor having phase difference detection pixels for performing focus detection; and
   at least one processor or circuit configured to function as the following units:
   an exposure control unit configured to cause at least the phase difference detection pixels to perform a plurality of accumulations whose exposure periods are a second exposure period shorter than a first exposure period which is a target for obtaining a main image by the image sensor; and
   a prediction unit configured to predict an in-focus position of a subject based on signals of at least two of the phase difference detection pixels obtained in at least two accumulations out of the plurality of accumulations whose exposure periods are a second exposure period.

2. The image capturing apparatus according to claim 1, wherein
   the exposure control unit causes the image sensor to perform exposure over a plurality of the second exposure period so that a sum of the plurality of the second exposure period becomes the first exposure period, and the at least one processor or circuit is configured to further function as a combining unit configured to generate the main image by combining a plurality of image signals obtained by the plurality of accumulations whose exposure periods are the second exposure period.

3. The image capturing apparatus according to claim 1, wherein the prediction unit predicts the in-focus position of the subject using thinned-out signals that are at equal intervals among signals obtained by the plurality of accumulations whose exposure periods are the second exposure period.

4. The image capturing apparatus according to claim 3, wherein the exposure control unit adjusts an interval for performing accumulation over the first exposure period based on an interval for performing a calculation for predicting an in-focus position of the subject.

5. The image capturing apparatus according to claim 3, wherein the image sensor outputs a signal used for generating the main image at a timing of outputting a signal that is thinned-out and is not used for predicting the in-focus position of the subject.

6. The image capturing apparatus according to claim 1, wherein the prediction unit predicts the in-focus position of the subject using thinned-out signals that are not at equal intervals among signals obtained by the plurality of accumulations whose exposure periods are the second exposure period.

7. The image capturing apparatus according to claim 6, wherein the prediction unit predicts the in-focus position of the subject using the signal obtained in a last accumulation in the first exposure period among the signals obtained in the plurality of accumulations whose exposure periods are the second exposure period.

8. The image capturing apparatus according to claim 6, wherein the prediction unit predicts the in-focus position of the subject so that the prediction of the in-focus position of the subject ends before the first exposure period ends.

9. The image capturing apparatus according to claim 8, wherein the at least one processor or circuit is configured to further function as a lens control unit configured to perform control for focusing a photographing lens, and the lens control unit drives the photographing lens in the first exposure period.

10. The image capturing apparatus according to claim 1, wherein the prediction unit comprises a selection circuit for selecting a method of predicting the in-focus position of the subject.

11. The image capturing apparatus according to claim 1, wherein the exposure control unit drives the image sensor by a slit rolling shutter method.

12. The image capturing apparatus according to claim 1, wherein the image sensor can independently perform readout of a signal for predicting the in-focus position of the subject and readout of an image signal used for generating the main image.

13. An image capturing apparatus, comprising:
an image sensor having phase difference detection pixels for performing focus detection; and
at least one processor or circuit configured to function as the following units:
an exposure control unit configured to cause at least the phase difference detection pixels to perform a plurality of accumulations whose exposure periods are a second exposure period shorter than a first exposure period which is a target for obtaining a main image by the image sensor;
a comparison unit configured to compare a length of the first exposure period with a threshold; and
a prediction unit configured to, based on a result of comparison by the comparison unit, select one of a signal obtained by accumulation over the first exposure period and a signal obtained by accumulation over the second exposure period, and predict an in-focus position of a subject.

14. The image capturing apparatus according to claim 13, wherein the prediction unit predicts the in-focus position of the subject using the signal obtained by accumulation over the first exposure period when the length of the first exposure period is shorter than the threshold, and predicts the in-focus position of the subject using the signal obtained by accumulation over the second exposure period when the length of the first exposure period is greater than or equal to the threshold.

15. A method of controlling an image capturing apparatus provided with an image sensor having phase difference detection pixels for performing focus detection, the method comprising:
causing at least the phase difference detection pixels to perform a plurality of accumulations whose exposure periods are a second exposure period shorter than a first exposure period which is a target for obtaining a main image by the image sensor; and
predicting an in-focus position of a subject based on signals of at least two of the phase difference detection pixels obtained in at least two accumulations out of the plurality of accumulations whose exposure periods are the second exposure period.

16. A method of controlling an image capturing apparatus provided with an image sensor having phase difference detection pixels for performing focus detection, the method comprising:
causing at least the phase difference detection pixels to perform a plurality of accumulations whose exposure periods are a second exposure period shorter than a first exposure period which is a target for obtaining a main image by the image sensor;
comparing a length of the first exposure period with a threshold; and
based on a result of the comparison, selecting one of a signal obtained by accumulation over the first exposure period and a signal obtained by accumulation over the second exposure period, and predicting an in-focus position of a subject.

17. A non-transitory computer readable storage medium storing a program for causing a computer to execute steps of a method of controlling an image capturing apparatus comprising an image sensor having phase difference detection pixels for performing focus detection, the method comprising:
causing at least the phase difference detection pixels to perform a plurality of accumulations whose exposure periods are a second exposure period shorter than a first exposure period which is a target for obtaining a main image by the image sensor; and
predicting an in-focus position of a subject based on signals of at least two of the phase difference detection pixels obtained in at least two accumulations out of the plurality of accumulations each over the second exposure period.

18. A non-transitory computer readable storage medium storing a program for causing a computer to execute steps of a method of controlling an image capturing apparatus comprising an image sensor having phase difference detection pixels for performing focus detection, the method comprising:

causing at least the phase difference detection pixels to perform a plurality of accumulations whose exposure periods are a second exposure period shorter than a first exposure period which is a target for obtaining a main image by the image sensor;

comparing a length of the first exposure period with a threshold; and based on a result of the comparison, selecting one of a signal obtained by accumulation over the first exposure period and a signal obtained by accumulation over the second exposure period, and predicting an in-focus position of a subject.

* * * * *